United States Patent [19]

Couturier et al.

[11] 4,127,742
[45] Nov. 28, 1978

[54] TIME DIVISION TELECOMMUNICATION SYSTEM

[75] Inventors: Gordon W. Couturier, St. Charles; Nicola L. Jovic, Chicago; Simeon Aymeloglu, Mt. Prospect; William G. Bartholomay, Chicago; Melvin Winn, Schaumberg, all of Ill.; Suhas Ghosh, San Jose, Calif.

[73] Assignee: International Telephone and Telegraph Corporation, New York, N.Y.

[21] Appl. No.: 829,669

[22] Filed: Sep. 1, 1977

[51] Int. Cl.² .................. H04Q 3/60; H04M 3/00
[52] U.S. Cl. .................................... 179/18 FC
[58] Field of Search ........ 179/18 FC, 15 AQ, 15 AT; 340/172.5

[56] References Cited

U.S. PATENT DOCUMENTS

| | | | |
|---|---|---|---|
| 3,778,555 | 12/1973 | Nordling et al. | 179/18 FC |
| 3,912,873 | 10/1975 | Skaperda | 179/18 FC |
| 4,001,514 | 1/1977 | Wurst | 179/18 FC |
| 4,021,618 | 5/1977 | Wurst | 179/18 FC |
| 4,021,619 | 5/1977 | Potter et al. | 179/18 FC |

Primary Examiner—Thomas A. Robinson
Attorney, Agent, or Firm—James B. Raden; Marvin M. Chaban

[57] ABSTRACT

A telecommunications system which is capable of implementation in many configurations. The simplest and smallest configuration is that of a single processor-controlled module or unit using time division switching. Within a module, a processor and its attendant memory provide program memory and control the functioning of an automatic scanner driver, the automatic scanner driver interfacing between the processor and the system terminal circuits. In addition the automatic scanner driver has capability of storing temporary information during call processing through a time division switching network. For configuring larger systems, plural modular units are combined, the units being combined with control elements common to the system such as a control processor, including memory and a processor to module interface and module to module interface. The common elements act to control the feeding of information between modules. In this way, one family of systems may provide systems of any desired size from small (50 lines) to many thousand lines.

12 Claims, 14 Drawing Figures

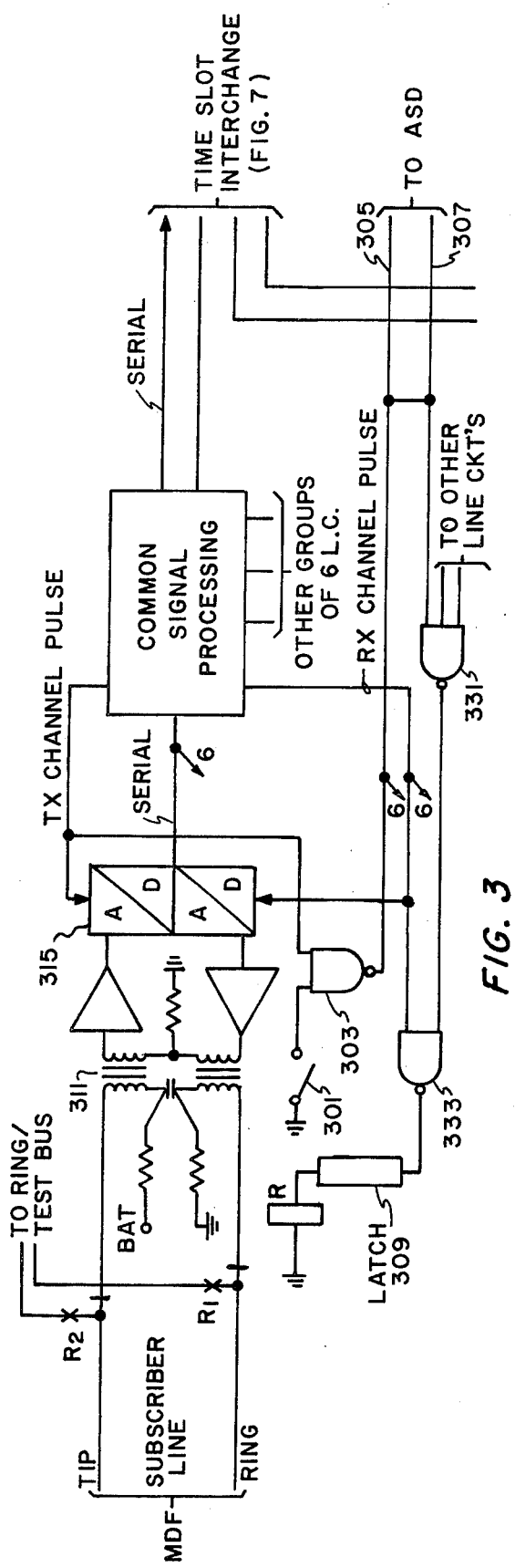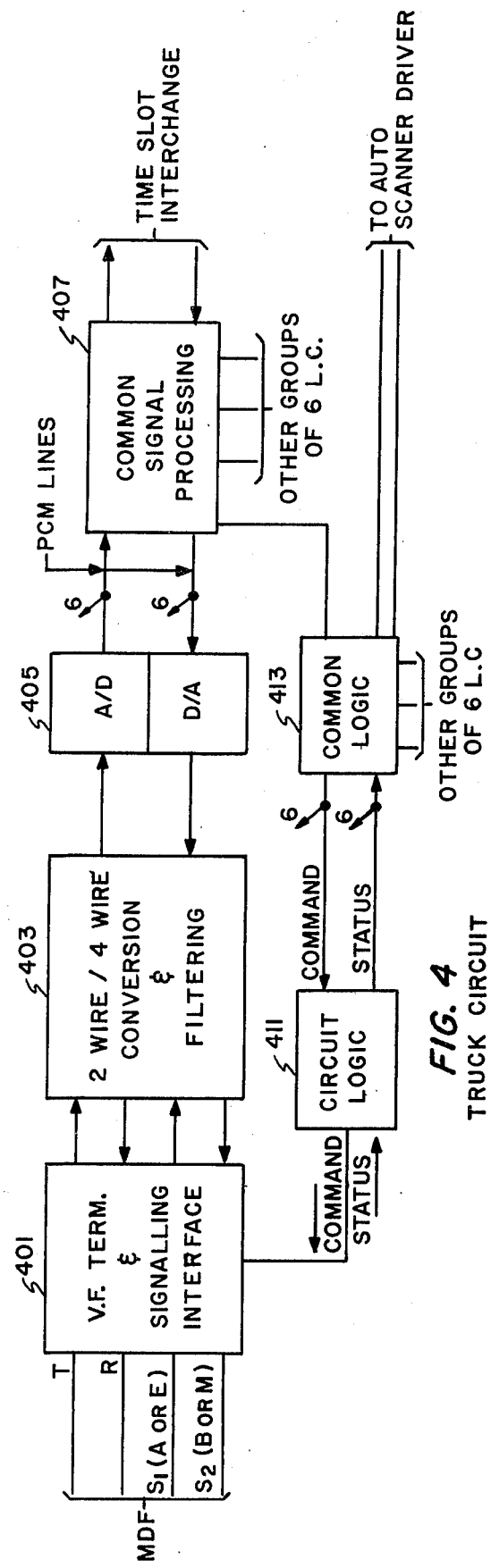

SCANNER DRIVER

TIME DIVISION TELECOMMUNICATION SYSTEM

BACKGROUND OF THE INVENTION

Processor controlled telephone systems are of course well-known. In these systems, at least two central processors are generally provided. In some of these systems such as U.S. Pat. No. 3,557,315 to Kobus et al., the two central processors share the call load on a continuous basis. In other systems, such as the Bell System ESS-1 as shown by U.S. Pat. No. 3,570,008 to Downing et al., the two central processors operate in a synchronized arrangement. The present system falls into the latter category i.e., active-standby.

Telecommunications systems using time division switching are also well-known in the art. For example, see U.S. Pat. No. 3,937,892 to A. Block et al. Within such systems, the subdivision of timing slots for usage is shown in U.S. Pat. No. 3,991,276 to A. Regnier et al. U.S. Pat. No. 3,941,936 issued Mar. 2, 1976 to Graham et al. discloses another time division controlled system with some similarities to the present system.

Since the advent of microprocessors, distributed processor technology has been developed for computer systems. With distributed processors, much of the complex and expensive control function can be performed on a more localized base lessening the system cost.

SUMMARY OF THE INVENTION

The present invention is directed to a processor-controlled telecommunications system capable of a plurality of configurations. In its simplest form, one module or grouping is provided with its own processor. For larger exchanges, multiple modules are provided each with its own processor. Intermodular telephony communication is controlled by a system processor and information transfer apparatus.

Each of the processors, whether a module processor or a common processor, comprises one or a pair of microprocessors with add-on memory, the microprocessors when in pairs operating in an active-standby mode. Each microprocessor may be a commercially produced, large scale integrated circuit device, as is well-known.

Within each module, many of the control functions such as the timing and cycle control are performed by an automatic scanner driver. The automatic scanner driver interfaces between terminal circuits (lines, trunks etc.) to pass control commands and data from the processor to the terminal circuits and vice versa.

Within the automatic scanner driver, temporary memory locations are provided for each addressable circuit, such as terminal circuits, corresponding to each transmit (Tx) time slot and each receive (Rx) time slot. Further, memories are provided as buffers for commands between components of the system, and for the status of various components of the system.

Memory and logic are distributed throughout the system with the processor performing program memory retrieval and control, interrupt control and system supervision and maintenance, and the automatic scanner driver providing buffer memory and certain registry functions in carrying out orders from the processor and for informing the processor of the status of the scan and drive operations.

It is therefore, an object of the invention to produce an improved time division multiplex telecommunications system which is modular in construction to enable use of the system for small to medium sized central offices.

It is a further object of the invention to provide a telecommunications system which uses time division multiplex with one or more microprocessors to provide control functions, as the system size demands.

It is a still further object of the invention to provide a telecommunications system using time division multiplex sampling at a considerably faster rate than is necessary to provide proper speech sampling, the high sampling rate enabling the use of inexpensive digital filters.

It is another object of the invention to provide a time division switching system in which a time slot is allotted for each party to the conversation, the time slots being interrelated through time slot interchanges for each party to a call.

It is a still further object of the invention to provide a new and improved time-space-time switching system.

These and other objects, features and advantages of the invention will become apparent from the following specification viewed in conjunction with the drawings as described briefly hereafter.

BRIEF DESCRIPTION OF THE DRAWINGS

FIG. 3 is a block diagram of a line circuit comprising one of the terminal circuits in FIGS. 1 and 2;

FIG. 4 is a block diagram of a trunk circuit comprising one of the terminal circuits in FIGS. 1 and 2;

DETAILED DESCRIPTION OF THE DRAWINGS

Figure 1:
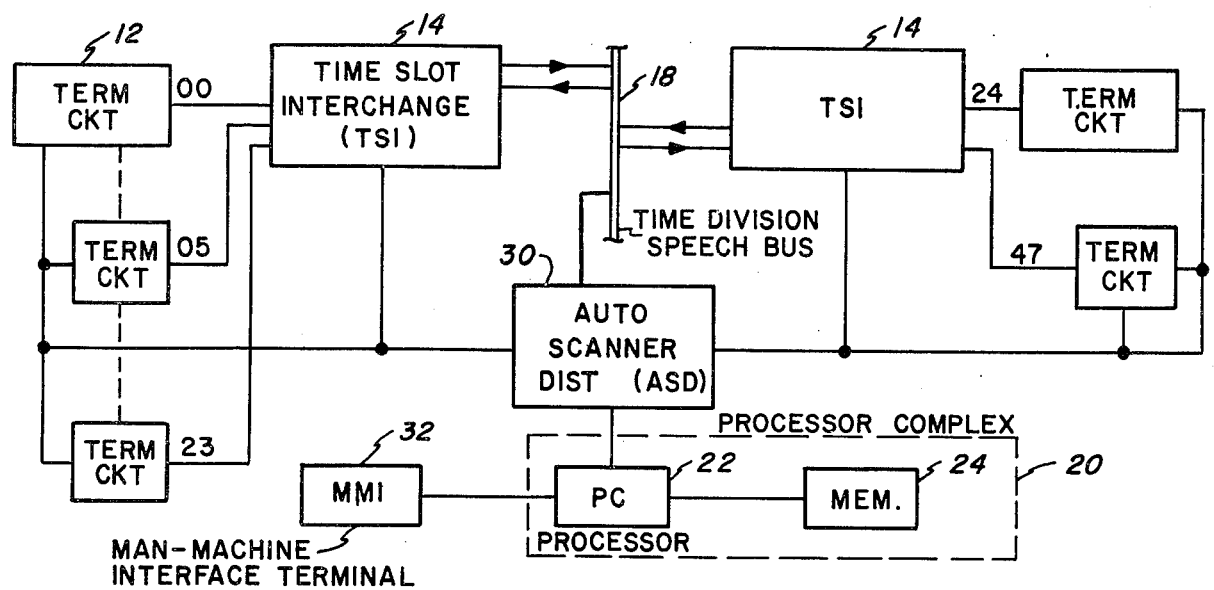
FIG. 1 is a simplified block diagram of a system module employing our invention.

In FIG. 1, we show a small capacity telecommunications system with capacity of up to 512 terminal circuits. The small system will be called a module herein, a module being defined as a combination of circuits essentially capable of functioning in stand alone fashion as an exchange and also capable of being joined with other modules to multiple the number of terminal circuits which can be controlled within an exchange or office.

Thus, FIG. 1 shows a module including a plurality of terminal circuits 12. The term terminal circuits is used herein as a generic term to cover line circuits, trunk circuits, tone circuits, attendant circuits, conferencing circuits, tone receivers, tone senders and the like. The terminal circuits are grouped into groups of six circuits with four or five such groups being connected to a time slot interchanger circuit 14 the system being readily adapted to either 24 channel μ255 PCM or 30 channel A law PCM. Each time slot interchanger 14 (of which two are shown in FIG. 1) provides time slot allocation and memory for the speech paths, on the time multiplexed speech bus 18, the time slot interchanger circuits combinedly forming the time division switching network for the interchange of data in digital form between terminal circuits.

For controlling call processing, supervising, maintaining, testing and the like, a stored program processor complex 20 comprised of a microprocessor 22 and attendant memory 24 is provided. The microprocessor 22 may be any commercially available sixteen bit processor, such as the TMS 9900 microprocessor manufactured by Texas Instruments, Inc. The processor complex may include a duplicated microprocessor used in active-standby configuration (not shown in FIGS. 1 and 2).

The Time Division Bus 18 is an 8-bit parallel DC bus which conveys 96 bidirectional time slots during each frame. The speech sampling rate at this point is 8 kw/s and compatible with well-known Bell System D3 PCM encoded format.

Interfacing between the processor complex 20 and terminal circuits 12 is an automatic scanner driver unit 30 which detects the condition of a terminal circuit, feeds an indication of that condition to the processor complex 20 and maintains a memory of that condition for reference by the processor.

A suitable man machine interface terminal 32 which may be a teletypewriter, CRT or similar input output device or combination of devices may be provided to communicate with the system in conventional manner.

Thus, the system of FIG. 1 comprises a stored program, time division controlled telecommunications system for servicing a comparatively small number of terminal circuits.

Figure 2:
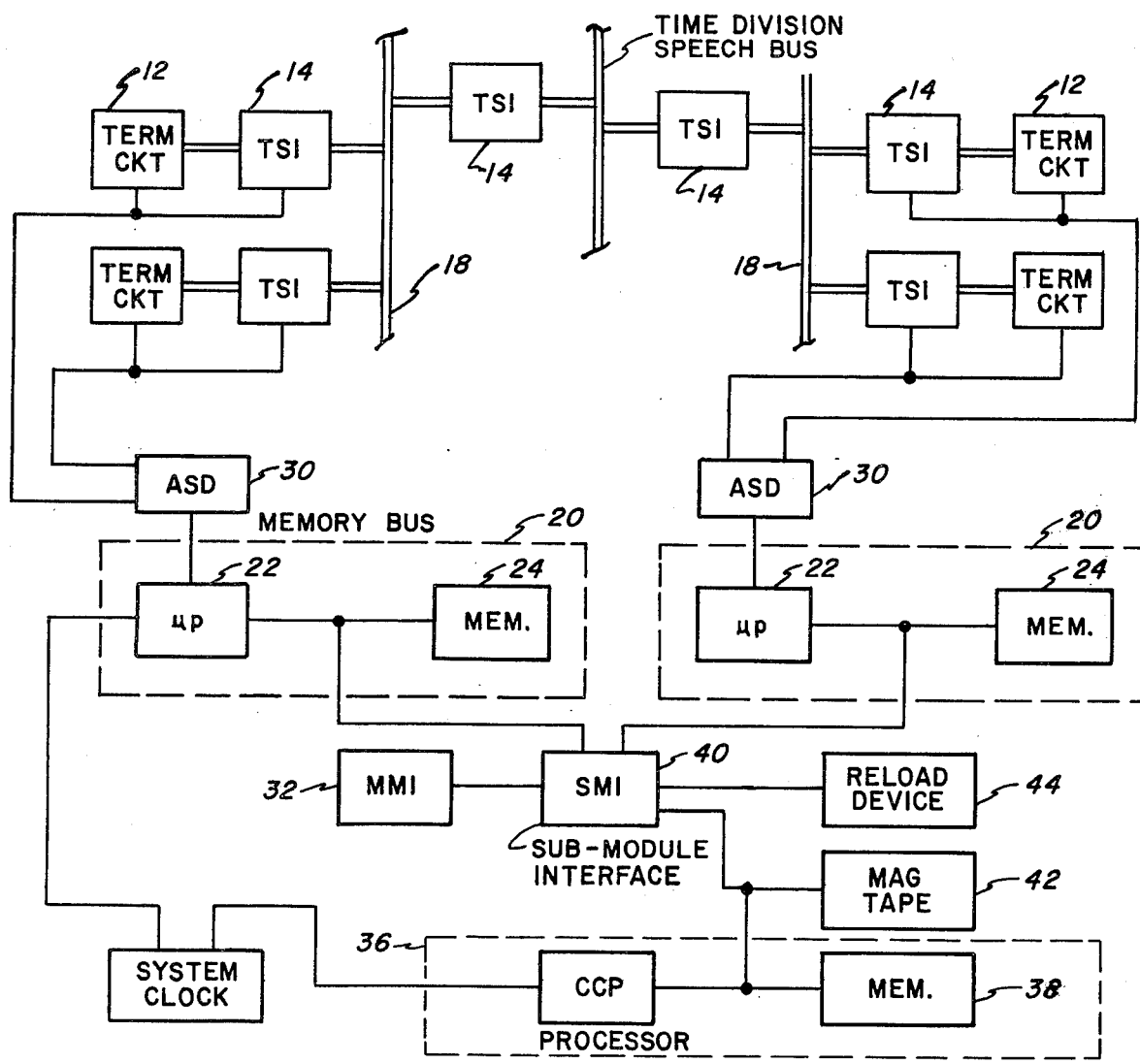
FIG. 2 is a simplified block diagram of a plural module system employing our invention.

When the capacity of the system in terms of the number of terminal circuits exceeds that of the FIG. 1 system, a plurality of modules may be joined into the larger system of FIG. 2. In FIG. 2, there is shown a two module system, each module comprised of processor complex 20, automatic scanner driver 30, time slot interchanger circuits 14 and terminal circuits 12, communicating across the time division speech bus 21.

A common processor complex 36 (including memory 38) controls the interaction of the module processors over a submodule interface 40. The processor complex 36 is very similar to a module processor complex 20 in its components including a processor such as the TMS 9900 microprocessor.

Thus, in order to progress in capacity from a single module system to a multiple module system, a common processor is provided with means for communication between the processors, called herein a sub-module interface. For larger systems, additional modules may be added with program changes in the central processor, its memory and by additions to the sub-module interface to accommodate the added modules.

Additionally shown in FIG. 2, are peripheral circuits such as a magnetic tape unit 42 and a reload device 44 whose function in telecommunications systems are well-known for storing systems records and data base and for reloading these into the system as necessary.

In this configuration, the magnetic tape unit 42, reload device 44, and man/machine interface 32 are connected to the submodule interface 40, thereby allowing any processor complex to communicate directly with these devices. In addition, any processor complex may communicate directly with any other processor complex without going through an intermediary process or complex.

Figure 14:
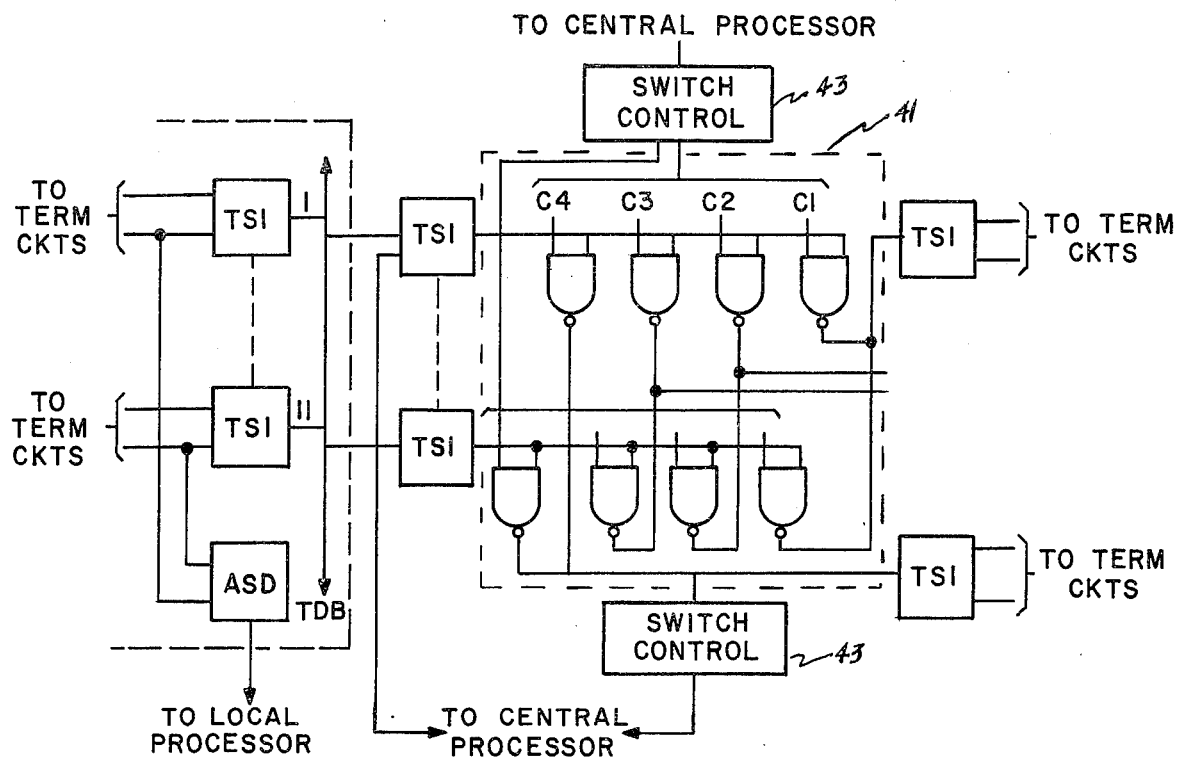
FIG. 14 is a simplified block diagram of the speech paths of a multiple module system employing time-space time switching.

FIG. 14 shows a system with larger capacity than that of FIG. 2. The system of FIG. 14 uses a space division switch in place of the system speech bus 18. The space division switch 41 is controlled by one or more switch controllers 43, as will be explained later herein.

The method of switching in the system of FIG. 1, FIG. 2 or FIG. 14 is such that when a connection is to be made between two Terminal Circuits located in the same Submodule, a time slot is assigned in the local time division highway. During each period in which the time slot appears on the bus, the two Terminal Circuits are connected to the local bus and communication is established. In the case where the two Terminal Circuits are located in two different modules, the connection is established under control of the Central Processor. The Submodule time slot assignments are under control of the Submodule Processor. The Submodule Processor works into the Submodule Interface (SMI) bus and the Central Control Processor Complex. In turn, the Central Control Processor assigns the path in the Space Switch, where used, and orders the time slot assignment in the second module by communicating through the SMI.

To produce a simplified design for a time division system which is compact in size and can be manufactured economically, the converters (analog to digital and digital to analog) are located in the terminal circuits. All data transferred from the terminal circuits to the Time Slot Interchange Circuit is in a serial digital word form for multiplexing on the time division bus. The analog to digital converters sample speech at a rate of 4 million samples per second to produce a binary bit (one or zero) for each sample. The samples are accumulated and compressed (PCM) into eight bit words produced at 8,000 words per second. The digitized voice sample is multiplexed in parallel form on to the time division bus. At the rate of 8000 words per second, a voice sample appears every 125 microseconds. A recurring time frame of 125μsec. is divided into 96 two way time channels, each lasting 1.3 microseconds. Thus, a one way time slot comprises 650 nano seconds. Within the 650 nano seconds time slot, eight bits of approximately 80 nano seconds duration may be provided. For 30 channel systems, there are 128 two way time channels, each lasting 960μsec. Thus, a one way time slot comprises 480 nano seconds and eight bits of 60 nano second duration.

For speech transmission any suitable eight bit PCM code may be used, the A/D converters providing the digitized code and the D/A converters decoding the words to produce output speech.

In FIG. 3, we show a line circuit which couples a subscriber station to the system the line circuit being one of the terminal circuits 12 of FIG. 1 or 2. Line circuits for digital time division systems are well-known. For example, see U.S. Pat. No. 3,997,738 issued Dec. 14, 1976 to V. Korsky et al. and U.S. Pat. No. 3,420,961, issued Jan. 7, 1969 to R. M. Averill.

The line circuits are grouped in groups of six line circuits, with four or five such groups coupled to a single time slot interchanger. A line circuit responds to condition changes on the line, such as the subscriber going off hook, and on hook and as a result, provides a signal which can be read by the automatic scanner driver to enable the system to respond to that condition change. The line circuit must provide coding and decoding, battery feed, and other common line circuit features. It interfaces the time slot interchanger (TSI) over a pair of leads and interfaces with the automatic scanner driver over a bidirectional signaling lead common to other terminal circuits.

In FIG. 3, there is shown within the line circuit a contact set 301 which corresponds to the hookswitch of a subscriber station instrument. This set of contacts 301 closes when the station goes off hook. This closure places ground on one input of NAND gate 303. When this ground coincides with a timing pulse indicating the time slot allocated to that line circuit within the time slot interchanger, a signal is sent to the automatic scanner driver over lead 305.

Similarly, when the terminal or line circuit of FIG. 3 is being called, and the status has been checked and found to be idle, relay R is operated in response to a command received from the automatic scanner driver over lead 307 to pass the command through successive NAND gates 331 and 333 and latch 309 to change the latch state, operate relay R and ring the station through the main distributing frame.

The speech path may be traced from tip and ring leads to the isolation transformer 311 where two to four wire conversion occurs to feed the analog to digital converters 315. The speech path continues through the common signal processing and timing circuits to the time slot interchanger; as is well known in channel bank technology.

On a call incoming to a station of the system, a tone circuit positioned as a terminal circuit on the same time slot as the called line emits its tone signals to the line circuit via the time slot interchanger. When the called station responds by going off hook, contacts 301 close and place ground on one input of the gate 303 to signal the automatic scanner distributor that the party has gone off hook and remove the ring signal from the line.

In FIG. 4, we show in block form the elements of a trunk circuit, the trunk circuit being a terminal circuit selected by the processor for calls to be forwarded out of the exchange of FIG. 1 or 2.

Four input/output leads to the exchange line are provided, tip and ring for speech and E and M leads for signaling, as is conventional. The speech leads pass through the voice frequency terminal and signaling interface 401 and a 2 wire to 4 wire converter and filter 403 (similar to transformer 311 of FIG. 3), A/D convertors 405, and the common signal processing element 407.

For signaling control there is provided circuit logic 411 and common logic 413 which generally performs the function of gates 303, 331 and 333 of FIG. 3 to provide bidirectional signaling to the scanner driver, as to status and commands.

Figure 5:
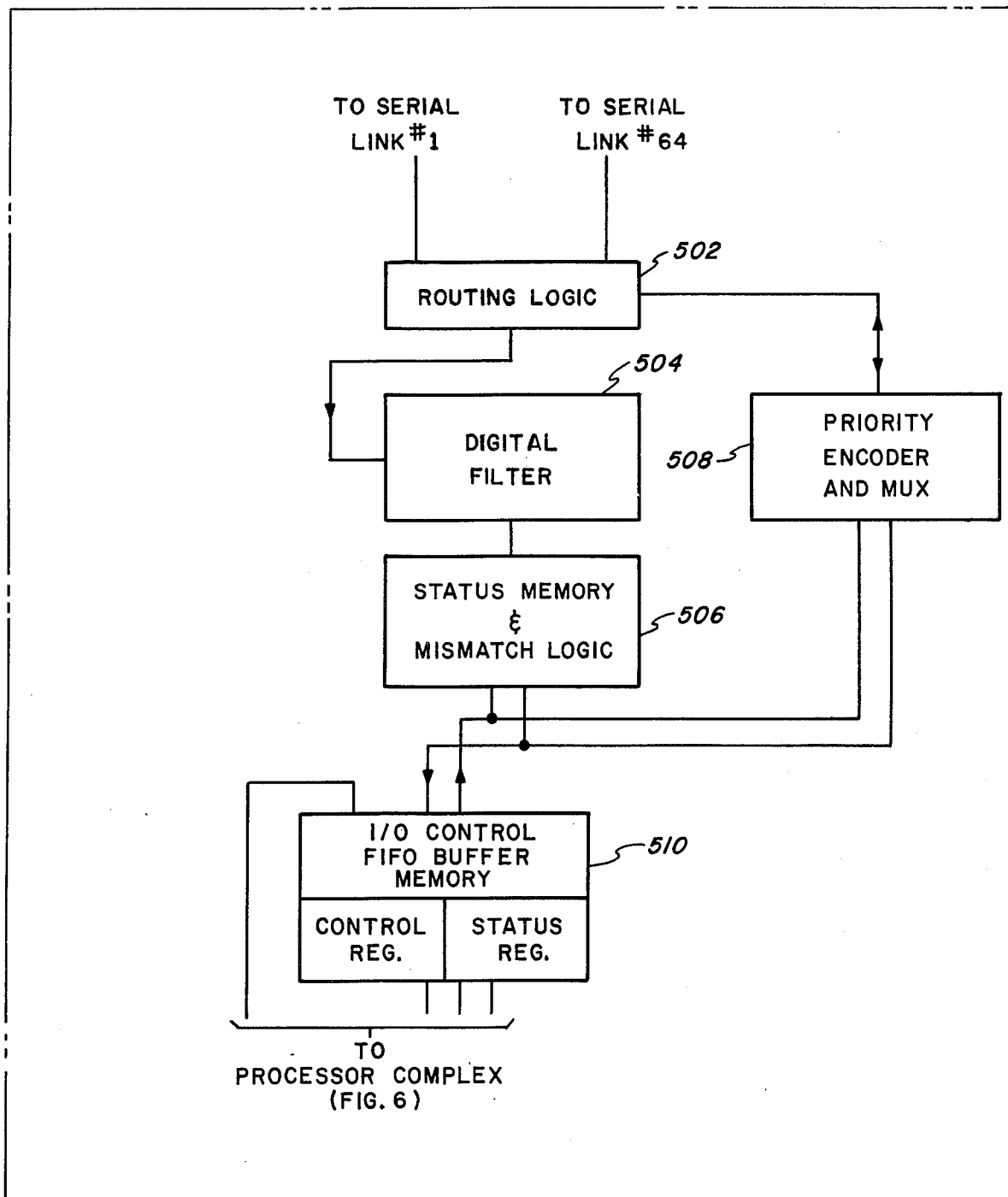
FIG. 5 is a block diagram of the automatic scanner driver of FIGS. 1 and 2.

The automatic scanner driver 30 of FIG. 5 provides bidirectional signaling between terminal circuits and the processor. The automatic scanner driver (ASD) circuit detects the status of different Terminal Circuits, such as, a change from on hook to off hook condition and vice versa. The change of status is delivered to the processor which is programmed to handle the change of state. On the output side of the processor, signaling and supervisory instructions are directed to the Terminal Circuits through the ASD circuits.

The signaling that indicates the status of the different terminals is extracted from the bit stream and checked for persistency. The processor polls the ASD every 10 milliseconds to detect status changes. When there is a change, the new status and equipment number is sent to the processor.

Commands destined for the terminal circuits are loaded into a command memory by the processor. The command memory is cyclically read and the results are inserted into the bit stream that is sent to the interface circuits.

In the circuit of FIG. 5, the automatic scanner driver is shown bidirectionally feeding information between the processor bus and the serial links of SMI 40 directed to the terminal circuits.

Within the automatic scanner driver, serial information is received within the Routing Logic 502. This Logic Block has a bidirectional 32 bit Shift Register for the serial data input relative to the terminal circuits serial link or TSI links, and a second 32 bit shift register for output of information in serial form on the serial links.

The input data is gated to one or the other of the outputs depending on whether mismatch analysis is required. Data which must be reviewed periodically, such as that from line circuits and trunk circuits must be forwarded to the Digital Filter 504 and Status Memory 506, while data which need not be analyzed in this manner is fed to the Priority Encoder and MUX 508. The priority Encoder is essentially a bypass path for data which need not be filtered and need not be analyzed for mismatch. The decision as to which path to which data is to be switched is made by analyzing one or more bits of data.

The Priority Encoder multiplexes data from the Routing Logic and selects inputs for the I/O Control Reg. 510.

Input data which must be analyzed is passed to the digital filter. This filter samples at a higher rate than is necessary to prevent erroneous readings due to spurious signals or noise, acts as a counter for compiling the results of successive scans to determine actual changes in condition such as a subscriber going off hook. When the condition changes as indicated by a change from one to zero or zero to one of a specific bit in the bit stream, the filter acts to integrate the change and in effect time its continuance. In this way, transients causing a momentary change of condition may be discounted and ignored. Only a change in condition which persists for a count period is noted as a mismatch and forwarded to the status memory.

The status memory and mismatch logic 506 comprises a RAM memory with a storage position for each terminal circuit adapted to be written under the control of the processor.

Eight bits are stored at each location, five bits used for status and three for control. The status bits are used for comparison with a mismatch on a last-look basis. The status section comprises a last-look section and a current condition section for each terminal circuit. The last-look section is only updated by the processor when the processor has acted on a mismatch signaled to it by the memory and Logic 506. Such memory and logic is shown by U.S. Pat. No. 4,001,514 issued to W. K. Wurst on Jan. 4, 1977 for Subscriber Digital Multiplexer With Time Division Concentration.

In addition, the status memory 506 contains control information for each terminal circuit. Such information controls whether the terminal circuit should be scanned or not and the speed at which the scan should be monitored. When a mismatch is monitored, an exclusive OR gate signals the mismatch to the I/O Control FIFO memory 510.

Relative to the speed of scan, or more correctly, the rate at which incoming information is analyzed, a normal scan speed of 100 milliseconds is employed. When a shorter scan is desired, for example, when dial pulses are to be analyzed, a scan speed of 10 milliseconds is used. The determination as to which speed at which data is to be scanned is made by the processor and forwarded to the status memory for implementation and control.

The Input/Output FIFO register 510 provides buffer memory between the status memory 506 and the processor. The eight bit words are sent to the respective busses, Data Control and Address for transmission to the processor. A sixteen bit word is loaded in parallel to the Control 510 and clocked out serially on the processor leads.

Figure 6:
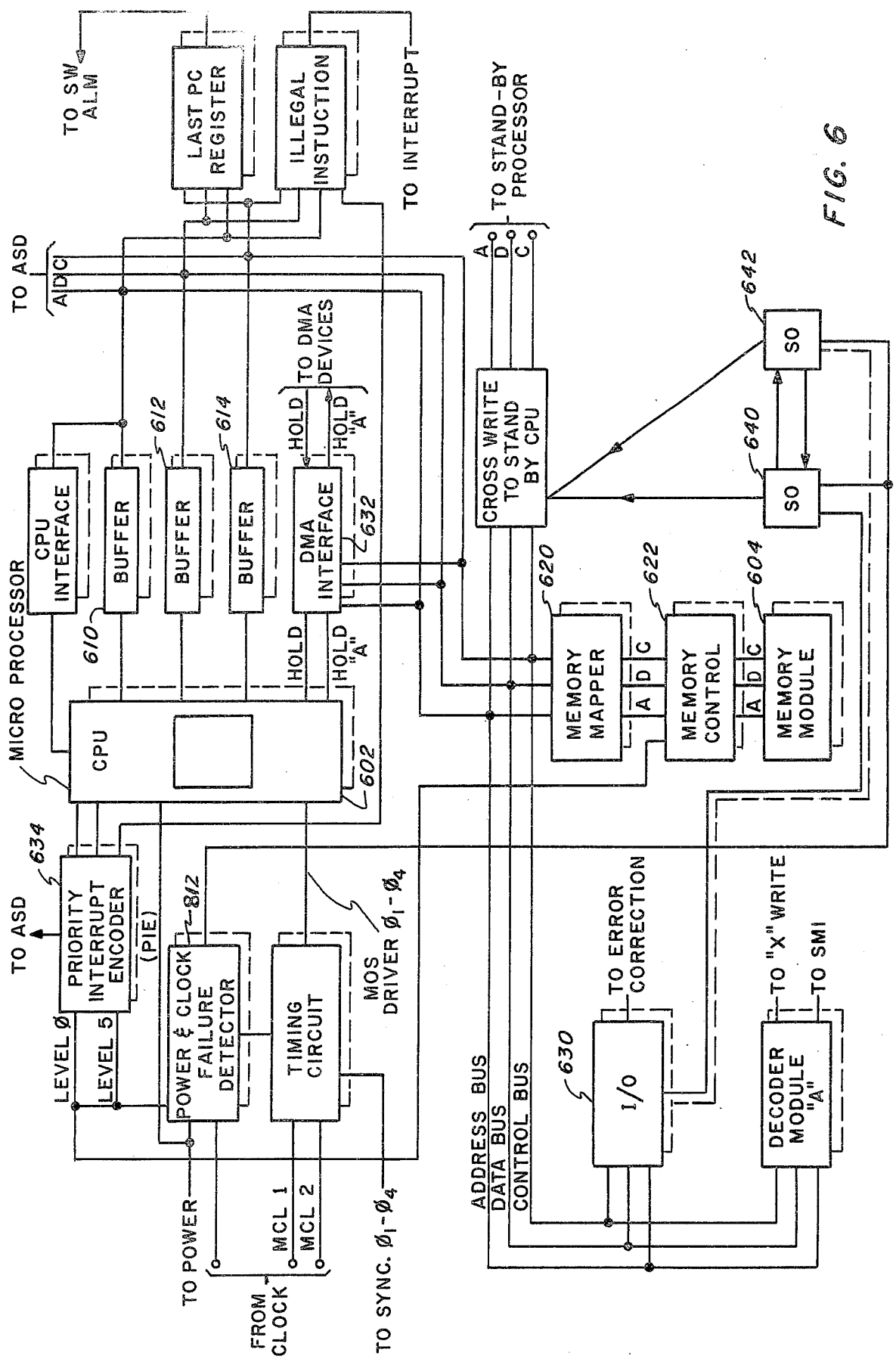
FIG. 6 is a block diagram of a processor complex of FIGS. 1 and 2.

In FIG. 6, we provide a block diagram of a processor complex 20 of FIG 1. In the block of FIG. 6, only one CPU 602 is shown, it being understood that a second CPU with its attendant memory 604 could be provided.

In the system embodiment disclosed, the single CPU shown may be a microprocessor of the type known as the TMS 9900 made by Texas Instruments, Inc. The TMS 9900 and literature describing it have been available since at least December of 1975. This processor is a 16-bit, single chip microprocessor using MOS N-Channel silicon gate technology. All information into and out of the processor 602 is buffered in respective buffers 610, 612 and 614 to the respective busses for address, data and control; the busses being directed to the automatic scanner driver. This processor has only four interrupt lines so that a maximum of sixteen interrupt levels can be provided.

The buffered busses are directed to other modules (if present) over the sub-module interface. These busses also provide access to between the scanner driver and the memory. The memory includes a memory mapper 620 for address expansion in addressing the memory module 604, the mapper acting through memory control 622. Memory mapping, per se, is a known function which may comprise paging in the manner of U.S. Pat. No. 3,972,025 to V. J. Taddei issued July 26, 1976.

Memory control 622 provides read and write signals for the memory, memory checks, parity or error correcting code checks and memory refresh control.

The memory module 604 is comprised of an array of 16 × 1 RAM devices.

The basic memory module may be a 64k × 22-bits wide block if error correction code is implemented, or 64k × 17-bits wide block if parity checking is implemented.

The memory module comprised of RAMS may be organized in 4 rows, each containing either 22 or 17 RAM devices per row.

Additionally, a memory module may allow for the possibility of including RAM and PRAM devices.

With the memory mapper being used, the two most significant bits of the address field of 16 bits are used to identify each of the four 16k word blocks of the module. The four most significant bits (17–20) are used to decode 1 of 16 memory modules. The latter case shall be a part of the memory control function. In a system without a mapper, the most significant bit of the address bus (15 total) shall be used to identify two 16k blocks of memory.

It is preferable that the memory devices have operating speeds which are compatible with the processor. However, this is not mandatory because the ready and wait functions of the processor allows for independent operation regardless of the memory being used.

The I/O devices 630 are considered part of the memory space. This permits input/output data to be addressed by memory reference type instructions. For that reason, the last block of the logical memory is dedicated to I/O and DMA devices (maximum of 256 devices).

An I/O or DMA port has the following capabilities incorporated:

(1) Inputting or Outputting of data;

(2) Outputting status word of I/O or DMA device, or inputting a command word from the processor.

In case of an I/O device, the capabilities in (1) and (2) above are performed under program control.

Any I/O device 630 or DMA device 632 shall be capable of generating an interrupt which appears at the assigned level of the priority interrupt encoder (PIE) circuit 634. These devices maintain the interrupt condition until it is answered by the processor. The processor acknowledges an interrupt by generating a command to reset the flag bit of the I/O or DMA word.

The direct memory access (DMA) has the capability of an external device to gain access to the processor memory and to perform reading or writing functions without the aid of the processor.

The DMA port in many respects, is similar to that of an I/O device. In addition, the DMA provides for the following:

(1) Three-state (O, L, H-Z) control of the data, address and control lines HOLD and HOLDA signals of the processor.

(2) Two registers with incrementing and/or decrementing control. The first register contains the beginning address of the memory block assigned to the DMA facility. The second register contains either the last address of the memory block or the word count of the memory block to be transferred. The initial setting of these parameters are accomplished under program control.

(3) In general, a DMA termination interrupt appears at the PIE at a level different than an I/O device. These termination interrupts are the result of normal transfer terminations or error conditions.

(4) The required DMA facilities appear only at the submodule interface. However, peripheral devices, such as disc or magnetic tapes, which may be dedicated to the central processor complex can be DMA based as well.

Figure 11:
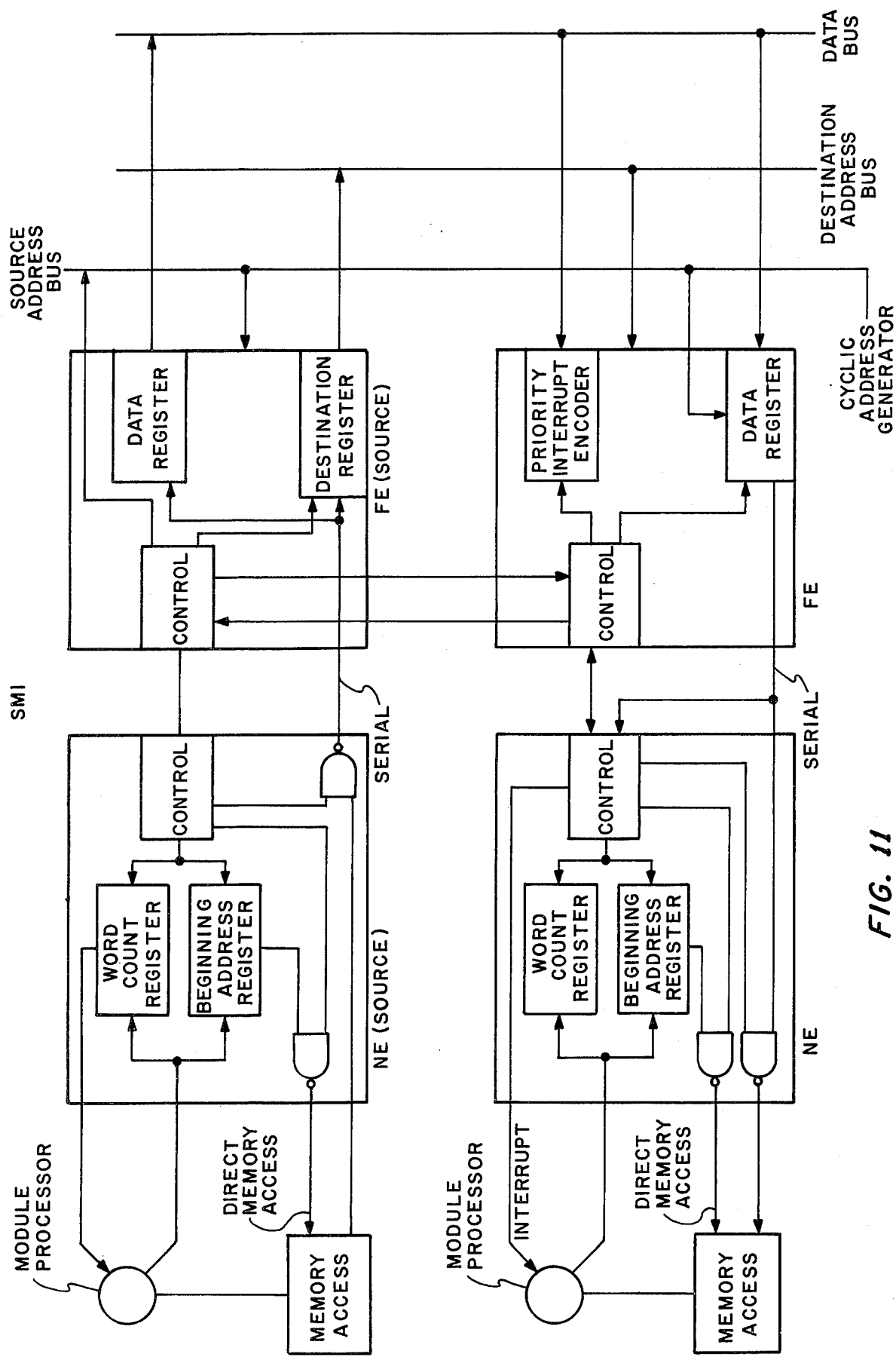
FIG. 11 is a block diagram showing the sub module interface of FIG. 9 in greater detail.

A switchover unit 640 is introduced only in a duplex processor complex configuration, as shown in FIG. 11. The switchover (SO) unit (640, 642) is designed for reliability in the duplex configuration. A hardware crosschecking circuit controls operation and/or alarms.

This unit causes switching from use of the active to use of the standby processor, when required, or when trouble arises in one processor. The SO unit also controls the cross writing of information into the memory of the active processor and also the standby processor.

Figure 7:
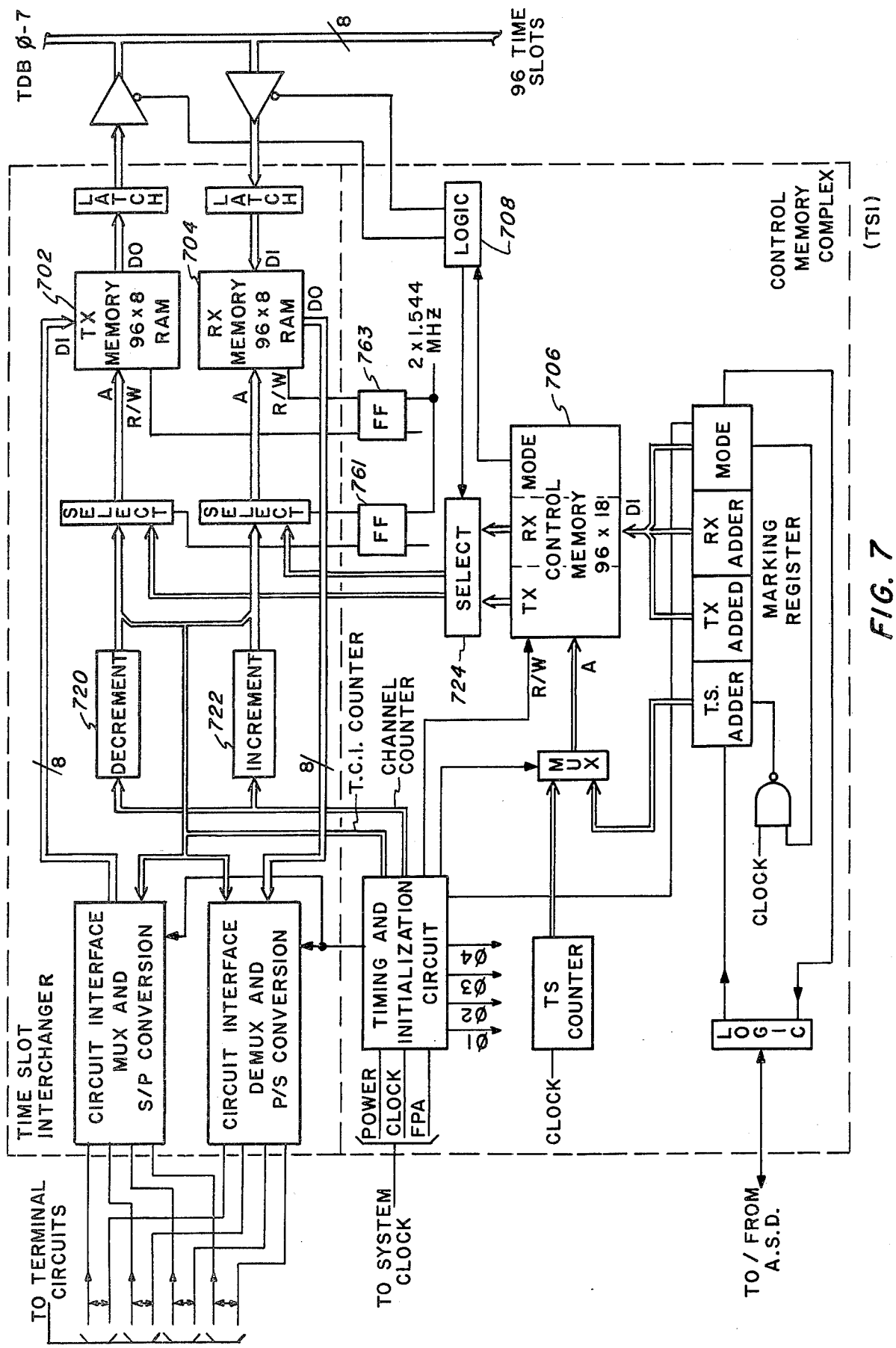
FIG. 7 is a block diagram of the time slot interchange circuit of FIG. 2.

In FIG. 7, we show the time slot interchanger 14 which switches speech between a calling and a called station. An interchanger (TSI) such as that of FIG. 7 is coupled to 96 or 120 terminal circuits for receiving information in digital form from these circuits. Time slot interchanging generally is shown by U.S. Pat. No. 3,787,631 to Lewis dated Jan. 22, 1974.

Within the TSI, each terminal is allocated a dedicated time slot so that a call from one terminal to another is completed through a system time slot on the time division bus (of FIG. 7) which converts speech from the dedicated time slot to the system time slot. As mentioned previously, a system time slot is allotted by the processor to handle a call.

As seen in FIG. 7, the TSI includes two major sections (as denoted by dashed lines) the interchange network and the control memory complex.

The Time Slot Interchanger 14 converts dedicated channels into random time slot channels for the time division bus (TDB). The TSI is controlled by the Automatic Scanner Driver 30 and records marking information in its control memory. The TSI may be an LSI chip which will be allocated on a 24-channel basis.

The TDB introduces concentration into the system. The number of the TSI's that will interface with the TDB are determined by the traffic carrying capacity. For a single Submodule system and low traffic (e.g. 3 ccs/line), the number of terminals (lines, trunks, etc.) included in the system can be as high as 1000. However, for a multiple submodule system and moderate traffic, a Submodule will not handle more than 500 to 600 terminals. Consequently, the maximum number of TSI's could be from 40 to 45 units.

The interchange network of FIG. 7 contains a transmit memory 702 and a receive memory 704 which serve for the data interchange. Each system time slot is divided into two halves. (See FIG. 13). In the transmit side, during the first half of the time slot, information is read out from the TX or transmit memory in a "random" fashion onto the time division bus. This randomness is determined by the control memory complex, which will be described below. During the second half, speech samples arriving from the terminal circuit interfaces are written into the TX memory in a cyclical manner after having been appropriately multiplexed. In the receive side, the reverse takes place. During the first half of the time slot, information is read out of the RX or receive memory in a cyclical manner and further processed (demultiplexed, etc.), whereas during the second half information is written into this memory in a "random" fashion.

The control complex (of FIG. 7) has as its main element, control memory 706 which is used for the storage of the address of the channel or channels that are taking part in a conversation during a given system time slot. In addition, this memory stores a code that determines the mode of operation, namely the nature of communication (one or two-way) internal or external, phase relations, etc.). The marking information is transmitted to the TSI in a serial form over a separate line. Furthermore, the control memory complex includes some logic that controls the read-write operation as well as selection of the output memories of the interchange network.

In addition to the two output memories 702 and 704, the TSI includes selection circuitry to select between a cyclic or random addressing of the memories, as will be explained more fully.

In the system, the time division bus will accomodate 96 bidirectional time slots. Since the sampling is done at an 8 Kw/sec. rate, each frame is 125μsec. long, which in turn means that each bidirectional time slot will be 1.3μ sec. wide (650 ns for each direction). The timing for the overall system will be determined, bearing always in mind that the time division bus time slots are considered as reference throughout the submodule.

These transmit and receive memories serve as the means by which the time slot interchanging is accomplished. A proper interchange is ensured by appropriately addressing these memories and reading or writing into them. During a time interval of 1.3μ sec., each one of these memories will have to be addressed 4 times, in order to meet the need for the worst case, namely internal communication (two lines on the same TSI).

Figure 13:
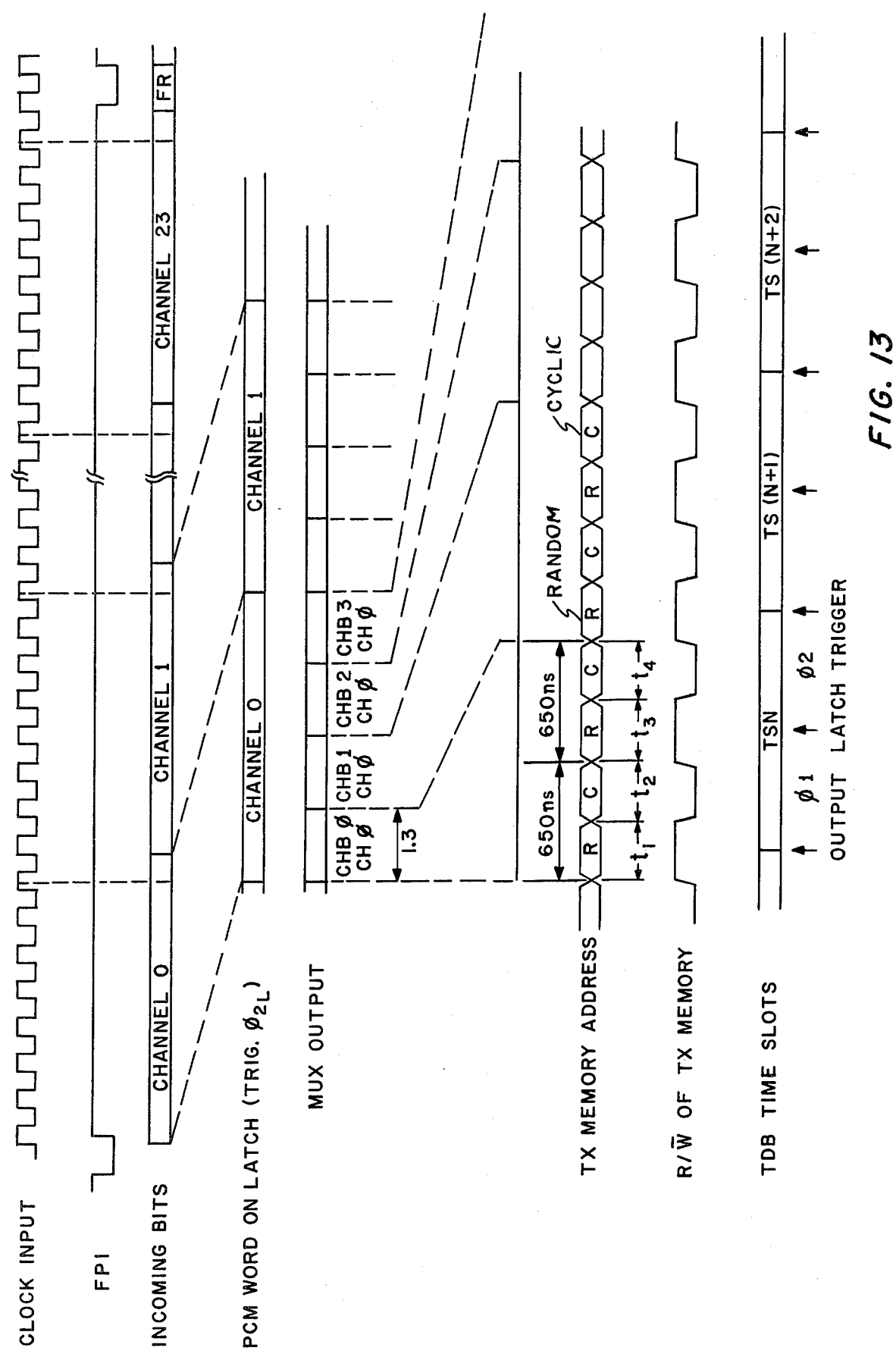
FIG. 13 is a timing chart showing the time slot interaction for the system.

As viewed in the timing chart of FIG. 13, the $\phi_1$ and $\phi_2$ phase indicate the first or second half of the TDB or system time slot. In the TX side, during the 325 ns. corresponding to $t_1$ and $t_3$ (if the communication is not internal, only $t_1$ or only $t_3$ is valid, depending on the mode bits of the control memory) the memory is addressed in a "random" fashion (corresponding to the TDB time slot) and the speech sample that was written in this location during the previous frame is read out. During the following 325 ns. ($t_2$ and $t_4$), the memory is addressed cyclically and a new sample is written into it. Note the TX memory is written twice during the same sample during the time interval, $t_2$ and $t_4$. This is done only for ease of circuit implementation and is not function necessary.

Every time a sample is read out of the TX memory, it is placed on a latch, thus ensuring that it remains on the time division bus for the full 650 or 480 ns., i.e. during the entire half of a TDB time slot ($\phi_1$ or $\phi_2$) allocated to that particular one-way transmission.

The selection between the cyclical or the random address is done via a select circuitry that selects between the output of a cyclic address generator and the control memory complex TX side output.

Since the TSI serves 96 or 120 circuits, then the maximum memory size that is required will be 96 × 8 or 120 × 8 to accommodate up to 96 or 120 samples of 8-bits each. Consequently, the memory addressing requires a 7-bit address. Of these, the two least significant bits will come from a counter that is used to multiplex the 4 terminal circuit interfaces, (terminal interface counter) whereas the 5 most significant bits will come from a counter that corresponds to the channel number of each terminal circuit interface (channel counter).

In the receive side the reverse operation takes place, namely speech samples are read out via cyclical addressing of the RX memory, whereas samples are written into it in a random fashion, the random addressing coming from the RX side of the control memory complex.

The select circuitry control as well as the R/W control of the two memories is done from the control memory complex.

Figure 8:
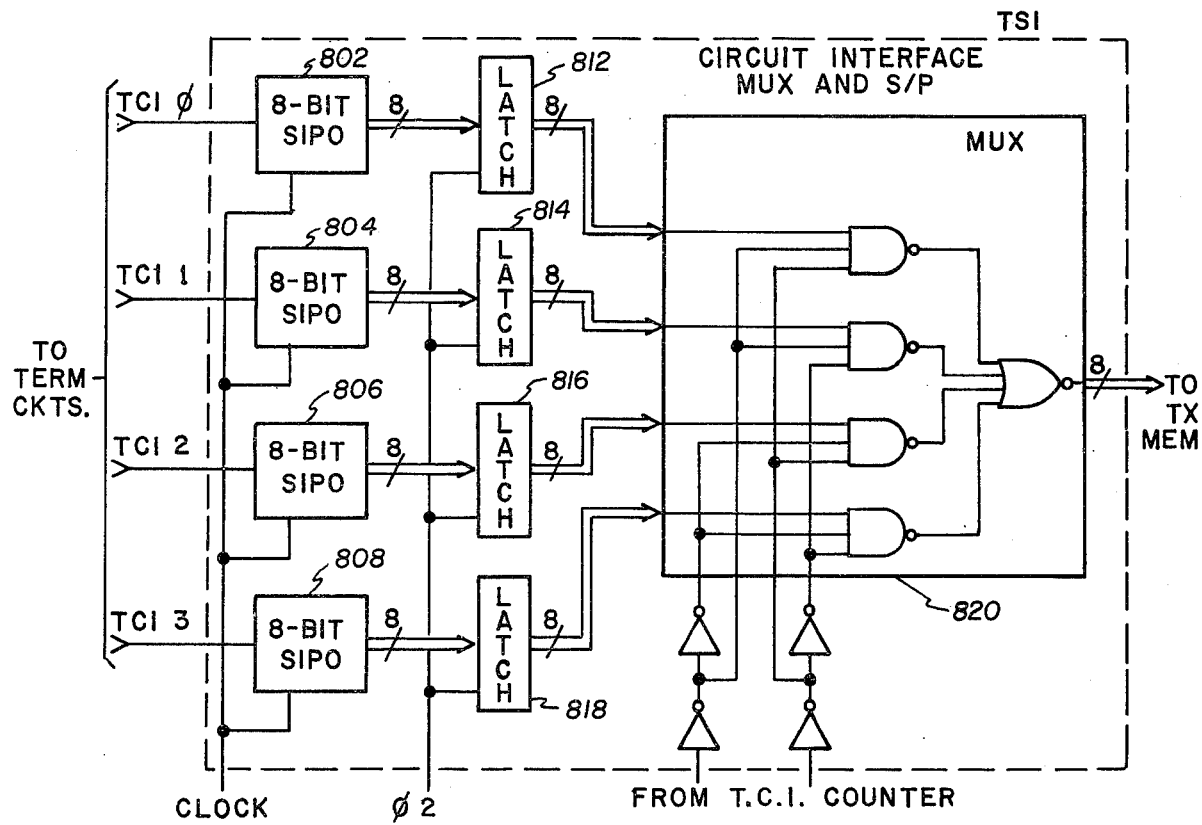
FIG. 8 is a block diagram of the circuit interface MUX of FIG. 7.

The terminal circuit interface (TCI) is shown schematically in FIG. 8, for the transmit side. It includes a serial to parallel (S/P) conversion of eight bit words in SIPO (serial in-parallel out) registers 802, 804, 806 and 808. The parallel bits are fed to the respective latches 812, 814, 816 and 818 and thereafter gated to multiplexer 820. On the receive side, the demultiplexing and P/S conversion will be done in a similar fashion and will not be described here.

The bit stream is arriving from each one of the four terminal circuit interface conductors (TCI 0–TCI 3) at the rate of 1.544 Mb/s or 2.032 Mb/s. (The remaining discussion will concentrate on the $\mu$ law system, but is equally applicable to the A law system.) Each 8-bit companded PCM word is converted to a parallel form and placed on a latch. The latch can be triggered at any time after the eighth bit has appeared in the SIPO output. In FIG. 8, $\phi_2$ phase of the clock (about 162 ns delayed from the 1.544 Mb clock), is used to do the triggering.

The samples remain on the latch for 5.2$\mu$ sec. Then they are appropriately multiplexed, thus ensuring that each sample appears in the TX memory input for 1.3$\mu$ sec. The multiplexing is done using a 2-bit counter (TCI counter).

The timing diagrams for the time slot interchanger are shown in FIG. 13. This figure which is only drawn for the transmit side — incorporates both the output memory timing as well as the multiplexing of the four TCI inputs. Naturally, for the receive side, we can draw a similar timing diagram.

The timing associated with the addressing of the output memories has previously been described. It need only be mentioned that the TDB time slots as well as the incoming bit stream are taken as reference because they are determined by the rest of the system and the TSI has no control over them. Thus, all necessary clock skewing is determined accordingly.

An important point to be noted is that during a Channel X, all four TCI inputs to the TSI receive a separate PCM word simultaneously. These words are latched during the eighth bit and then are multiplexed. However, it is easily seen that these are recorded into the TX memory during the time that the TSI input is receiving the PCM words of channel (X+1). In order to prevent this mismatch, the TX memory is addressed via a "decrement" circuitry 720 which decreases the channel counter output by 1. Similarly, in the RX side, an "incrementer" circuit 722 increases the channel counter output by 1 to accomplish the reverse function. Also note that in the TX side channel 23 must be converted to channel 0 and in the RX side the reverse.

The time slot control circuit of the control memory complex as can be seen in FIG. 6 generates the addresses for the output memories. The control memory stores the channel addresses of the communicating parties, and has them read out at the proper time.

The control memory comprises a 96 × 18 RAM 706, where the 96 words correspond to the 96 system time slots. Each word is composed of 18 bits (7 for the TX channel address, 7 for the RX channel address and 4 for the mode of operation). A suggested internal organization of this memory is as follows:

The mode bits determine whether (a) it is an internal communication or not, (b) whether it is a unidirectional communication or not, and if it is whether the particular channel is only transmitting or receiving, and (c) if it is a bidirectional communication with another TSI, the time division bus (TDB) time slot phase for transmit and receive. Thus, a logic circuit 708 activates during the appropriate time frame the tristate bus drivers and receivers, which serve to interface the TSI with the TDB. Furthermore, this logic circuit controls a selection circuitry 724 which applies the addresses to the TX and RX output memories. It is important here to note that in an internal communication (i.e. between two channels on the same TSI) both TX address and RX address from the control memory will have to be applied to both output memories during one system time slot. The control memory is addressed by a cyclic address generator. This is a synchronous 7-bit counter and counts from 0 to 95. The clock that is used to increment this counter is generated by dividing the MC1544 clock by 2. This counter is synchronized with the signal on lead FP1, an active low signal occurring during the 193rd bit of each frame. A signal on lead FP1 comes to the TS1 board from the clock distribution circuit.

The marking information comes to the control memory complex from the CPU via the automatic scanner driver 30 (ASD) over a single line.

The marking information is composed of 25 bits. Of these, 7 are for system time slot address, 7 for TX channel address, 7 for RX channel address and 4 for mode of operation. A low pulse indicates the start of the data train for marking information. When all this information is collected at the TSI, it is recorded in the control memory, complex during the next FP1 pulse (193rd bit of the frame). This pulse activates the R/W input of the control memory, and also the multiplexing circuit in order to address the control memory with the TDB time slot which is to be used. The low pulse that preceds the data train is also used to stop the clock that is used to collect the incoming marking data bits, when all these bits are collected. After the marking information is recorded, this clock is activated again, and this time sends back all the marking data to the ASD over the same lead, in order to check for correctness. At the same time, it clears the marking register by writing all 1's in it. If the marking information that comes from the CPU (via the ASD) to the TSI is for some reason mutilated, the above process is repeated.

Also used as control circuits are two D-type flip-flops: 761, 763, one of which controls the R/W of the TX and RX memories, and the other controls the selection circuitry in the interchange network. Both FF's are clocked at the rate of 2 × 1.544 MHz and synchronized by signal FP1.

The function of the power failure detection 812 (FIG. 6) is to detect any power failure at the board level. When power reappears, circuit 812 performs initialization of the control memory too. An active "low" signal output from this circuit directed toward the control memory complex, forces the control memory into the "write" mode. When the entire control memory is cleared of all information written into it, this signal goes "high" to allow for the normal operation of the TSI.

The clock failure detection circuit (shown as a single block with detection block 812) operates exactly as the power failure detection circuit, with the sole exception that it detects clock failure. When the clock fails, it issues an active low alarm signal (CLALR).

The channel counter gives a 5-bit output and counts the 24 channes during each frame. It is triggered by the output of another counter which is triggered by the MC1544 clock and counts to 8 for 23 times and to 9 the 24th time in every frame.

The terminal circuit interface counter has a 2-bit output and serves to multiplex the 4 terminal circuit interfaces.

Furthermore, a phase generating circuit generates all the phases of the 1.544 MHz clock which will be needed for the necessary clock skewing during the design of the circuit.

In normal operation a low pulse over the marking information lead indicates the beginning of the data train coming from the CPU via the ASD.

When the data is collected in the marking register the clock which is used to collect them is stopped. Thus, the collected data are the system time slot address, the TX address, the RX address, the mode and the phase.

During the first FP1 pulse after all the data are collected, the control memory is addressed by the system time slot address and the R/W goes low to record the data in the memory.

The data is sent back to the ASD. While the marking data is being sent to the ASD, the marking register fills with 1's. The control section is ready.

When the communication is finished, the ASD sends a signal to the MTSI setting out the system address and the mode.

The TSI introduces a maximum absolute delay of one frame or 125 micro sec. due to the fact that the information is written and then read out of the output TX (or RX) memory. The worst case is for a conversation between two terminals that reside in different submodules.

As can be seen, the maximum delay between the input of TSI 1 to the output of the TSI 4 is almost 4 frame delays or 500 microseconds. The delays that are added to the above during propagation or due to the space switch are insignificant.

When a plurality of modules of FIG. 1 are to be combined into a system as shown in FIG. 2, a submodule interface 40, a central processor 36 with its memory 30 and various peripheral circuits are provided. Germane to the operation of the system is the functioning of the sub-module interface 40, and the division of functions between module processors 22 and the central processor 36.

Figure 9:
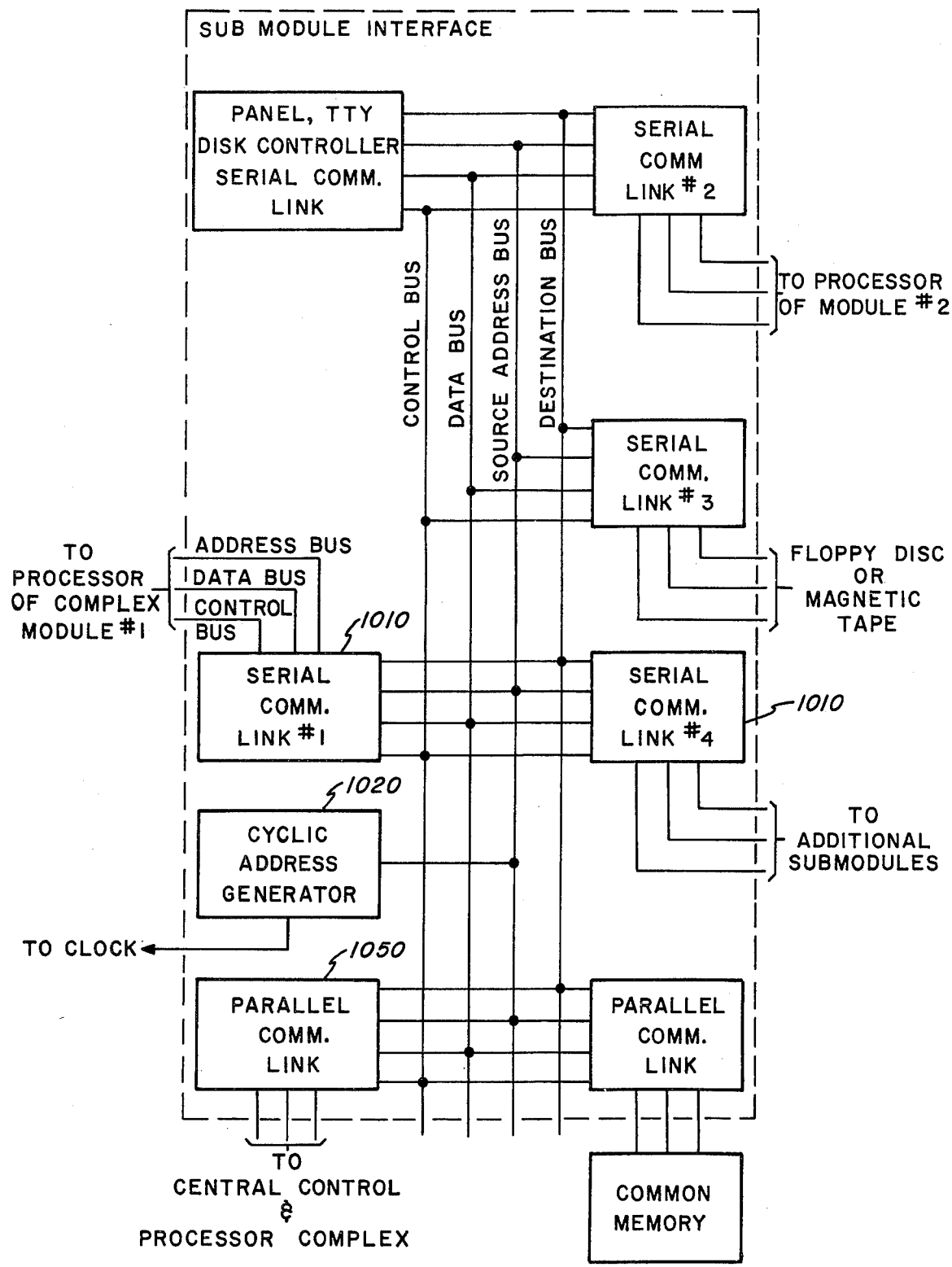
FIG. 9 is a block diagram of a sub module interface as shown in FIG. 2.

The sub-module interface (SMI) bus structure is shown best in FIG. 9. For each module to be added to the system there is provided a serial communication link 1010 having data, bus and control leads directed to each module processor. Each such link has a four conductor connection to an SMI bus with four bus conductors, the fourth bus being a destination bus. The common processor is coupled to the SMI through a parallel communication link, this link also having access to the memory for the system over the three buses, address, data and control.

A cyclic address generator 1020 is provided on the address bus, the generator providing a seven bit address with maximum capability of 128 addresses. The basic clock frequency provides a pulse width of 650 nano seconds for each time slot.

Figure 10:
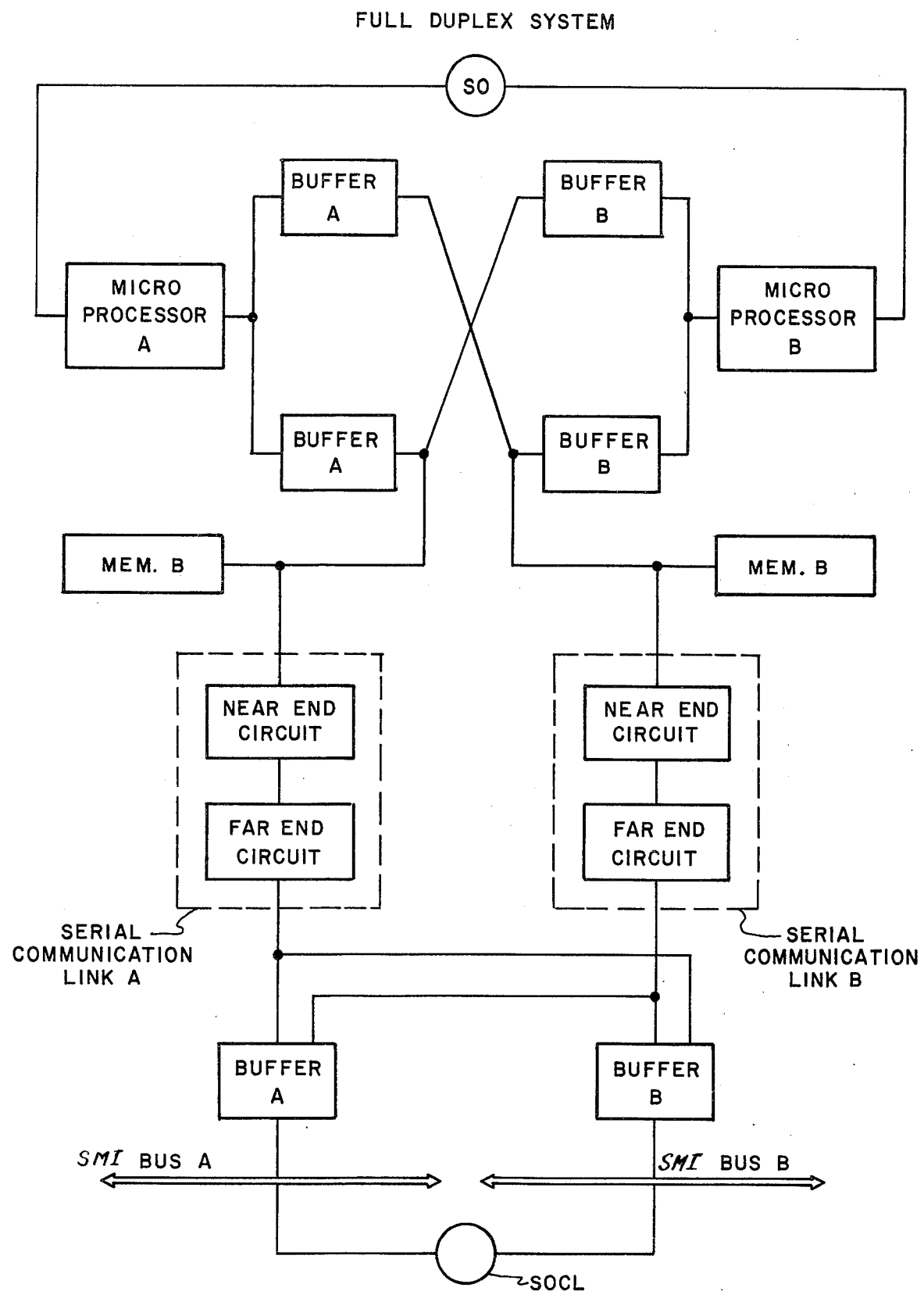
FIG. 10 is a block diagram of a duplex system of processor and sub module interface.

By the use of the bus arrangement, control signal may be interchanged between module processors and the central processor. As mentioned previously, the system may use a single processor with memory for each module in a simplex arrangement. Alternatively, the module processors may be duplicated in a duplex arrangement as shown in FIG. 10. In that arrangement an A and a B microprocessor, each with its own memory are provided with buffers such that a path from each processor may be traced through a buffer to a serial link and bus to the central processor.

As shown in FIGS. 9-11, the central part of the sub-module interface (SMI) is a time division bus system. The SMI includes four busses: a Source Address Bus, a Destination Address Bus, a Data Bus and a Control Bus. A Cyclic Address Generator (CAG) is associated with the Source Address Bus. The generator addresses all ports of the SMI bus in sequence every 62.5 microseconds.

Due to system constraints, a maximum of 96 ports is provided. Hence, the maximum transfer rate of the SMI is 32 MBS (16 bits × 96 channels/62.5 microseconds). It is important to note that the SMI is a very high speed parallel bus system which is almost devoid (except for the Cyclic Address Generator, CAG) of any intelligence. Up to N module controllers whose main function is the control of telephony equipment, may be interfaced with the bus. Typically, one port is provided per module controller. The Central Controller (CC), on the other hand, may have up to four appearances. Depending on the traffic, peripherals or terminals may be grouped as shown with one interface, or each may have its own interface. A common memory containing data and/or programs also is part of the system. Finally, any function such as man machine interfaces, from a local or remote location, may also appear as peripherals on the bus. The diversity of members that comprise the SMI set is another important characteristic of the SMI.

FIG. 11 shows the possible ways of interfacing various members to the SMI bus. In this figure, a serial communication link (SCL) is shown comprised of three parts, a Near End circuit (NE — near the processor), a Far End circuit (FE — far from the processor) and a metallic link between the Near and Far ends circuits.

In general, all module controllers and remote units use SCLs to communicate with the SMI bus. As seen in FIG. 9, parallel to parallel communication link 1050 is dedicated to the central control processor and to the common memory, while module controllers use serial links with a module processor as the host processor (to set up the connection). This PC module processor may be a dedicated processor for this function or could be a telephony equipment controller with the addition of this task to its normal functions.

All members having access to the SMI bus network communicate between themselves via messages. Hence, the basic unit of communication is the message which is always preceeded by a label and is made up of a variable number of words. The label contains all the necessary parameters of transmission, such as source and destination, interrupt level and the number of words in the message. Since a message is always unidirectional, the source and destination must be distinguished. In the full duplex mode of operation, a port may be both a source and a destination simultaneously.

Figure 12:
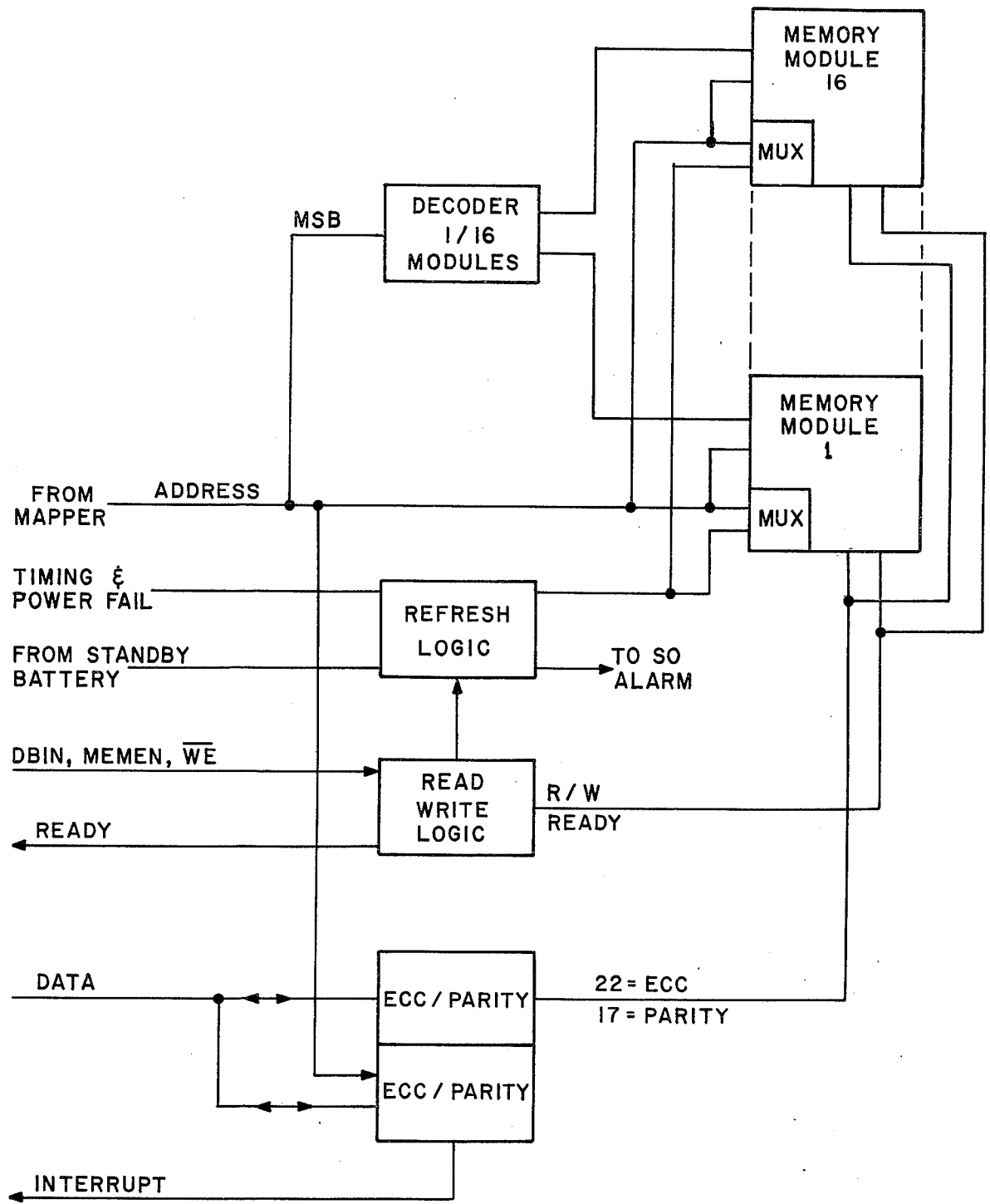
FIG. 12 is a block diagram of the memory control of FIG. 6.

A message starts from a processor for the module acting as a call source, the sole function of that processor being to insert parameters of transmission into the WC (word count) and BAR (beginning address register) (see FIG. 12) where the message is located in memory registers to the NE circuit. When these functions are complete, the module processor then relinquishes control. The NE circuit then, direct memory access fashion, extracts the label and other words of the message from the memory. After each extraction, the label or words are transferred serially to the FE circuit and the WC and BAR are decremented and incremented respectively. When WC = 0, an end of message is signaled to the microprocessor via an interrupt and to the FE circuit via control.

At the FE circuit the label is stripped of its destination address register and the rest of the label is stored in the data register. When the source FE is addressed by the Cyclic Address Generator via the source address bus, data from the register is read onto the Data Bus and contents of the destination address register appears on the Destination Address Bus. In a similar manner, other words of the message are placed on the bus under control of the generator. A word of label is considered to have been accepted only if an acknowledge signal is received from the destination FE circuit. The source FE uses this acknowledge signal to request a new word or to clear the DA register.

The destination FE circuit being addressed compares its own interrupt level (stored previously into the priority interrupt encoder by the module controller) with that carried by the label. If the comparison is successful, the destination FE circuit sends an acknowledge signal to the source FE circuit recreating the label by reading the source address which appears on the source address bus (SAB) and disabling the priority interrupt encoder (PIE) so that no new message can be initiated until the present one is transmitted. The recreated label, besides the code and word count, now carries the source instead of destination address. The rest of the message is transferred in exactly the same manner. In addition, each word except the label is accompanied by a link signal, generated by the source FE circuit which serves as a sort of password and uniquely identifies all words of the accepted message.

The destination FE circuit then alerts its NE counterpart circuit of a pending message and enables the control to transfer the label. Once the label is at the NE circuit it causes an interrupt at the module controller. The module controller reads the label and in response to it, stores the parameters of transmission in Word Count register (WC) and Beginning Address Register (BAR). The rest of operation is exactly for the fact that the message is now written into the memory. At the end of the message (WC = 0), the NE circuit signals the destination FE circuit to enable PIE priority interrupt encoder thus allowing new messages to be accepted.

In this operation certain points about the SMI should be noted:

(a) The microprocessor's active involvement in the operation is minimal; it is interrupted only once if sending, and twice if receiving. During short direct memory access periods, its activities are only momentarily suspended.

(b) Two ports, to whom connection is permitted are made busy and are unaccessable by other ports for the duration of the message. Since only one word can be transferred per cycle, any other port wishing to access either of these two ports is bound to experience a delay for that message. However, due to the speed at which the SMI executes, the probability of a maximum delay of 400 μs is less than 0.01 during peak busy hour, assuming typical telephony characteristics and a very large number of module controls trying to gain access to the SMI.

(c) All ports are treated equally and a port can be assigned to any processor or device.

(d) No intelligence is provided in the SMI bus system due to its high speed operation. This requires all FE circuits to be located close to the SMI bus itself.

(e) The maintenance of the SMI bus consists of two simple steps:

i. A microprocessor can test its own link by making the destination address the same as its own source address, thus allowing a test pattern to reflect back into itself.

ii. The SMI system may be tested by a chain reaction type of test whereby one processor initiates a test pattern, and sends it to another processor, which in trun sends back an acknowledgement to the originator and the pattern itself to another microprocessor. The process is repeated until the test pattern is received by the originator.

In each of the above cases, if the pattern does not match, or an acknowledgement is not received in a given time, an alarm is generated and a fault analysis routine is initiated. Both tests may be done periodically or on demand.

(f) For the sake of completeness, the duplex SMI system and its relationship to telephony equipment is shown in FIG. 10.

In a multiple module system, the processing of a call may be explained briefly as follows, the example being a line to trunk call from a station or line having rotary dial facility.

The origination of a call is detected by the scanner/driver and reported to the module processor, which in turn reports the condition to the central processor. A time slot is selected by the central processor and dial tone is sent by a tone source through the originating scanner/driver to the calling station in the selected time slot.

When the calling station hears the dial tone, the station user begins to dial. The local processor begins to accumulate digits, analyzes the digits and reports to the central processor, the indication of the outgoing trunk access code. The central processor selects an idle trunk and idle time slot for that trunk. A message is then sent to the module having the selected trunk as one of its terminal circuits, and to enable the terminating time slot interchanger. The terminating module seizes the selected trunk for forwarding of the call. The central processor notifies the originating module processor to enable its time slot interchanger for data transfer with the terminating module time slot interchanger.

Transmission between the two time slots in the respective time slot interchangers is established and dial tone indicating the capability of the system to receive further digits is sent back to the originating station.

The originating module processor collects the remaining digits and sends them directly to the terminating module processor over the sub-module interface bus network. The terminating module processor generates digits for outpulsing on the trunk. The time slots used for processing the call are used as the speech time slots with the call path being monitored by the originating and terminating processors.

On release by one station, its scanner/driver detects the release, notifies the local module. The central processor is notified and the call is released freeing the time slots for use.

In the system as described, module processors can and do communicate directly with each other over the submodule interface without assistance from the central processor. The same number of time slots are used to process a call from one module to another regardless of the type of call, i.e. line to line, line to trunk or line to attendant.

In FIG. 14, we show the use of a space division switch between time switch interchangers in a multiple module system similar to that of FIG. 2. The space division switch provides for connection between time slot interchangers TSI of various modules. The space division switch may be any simple switching arrangement controlled by a switch controller. The switch may be a series of two input AND gates or any other suitable switching devices. The switch controller may have suitable memory and speech paths between time slot interchangers. In this manner, by providing small multiple of switches (such as four) sufficient available paths are provided to carry the system traffic sufficiently.

Thus, using the simple system of FIG. 1, a single module system may be configured. A larger system is produced by either the system of FIG. 2 or that of FIG. 14. The system of FIGS. 2 and 14 comprises a multiple of module of FIG. 1, suitably interfaced and provided with a central processor and memory directing the activities of the individual modules.

We claim:

1. A telecommunications system for operating in time division multiplex, comprising a plurality of terminal circuits grouped into modular units with each such unit including a time division concentrator, a time division highway for associating terminal circuits of a group with the input side of said concentrator, a time division multiplex bus on the output side of said concentrator, a space division switching network for completing connections between terminal circuits of different units, said network comprising plural input paths and plural output paths with each of said paths coupled to one of said concentrators, in which each of said concentrators includes a first memory for storing samples of data being transmitted to terminal circuits and received from terminal circuits, and a second memory for storing addresses of time slots of said highway to control the interchange of said data between units in said system.

2. A system as claimed in claim 1, in which each time slot of a highway is dedicated for use by a respective one of said terminal circuits, and in which a concentrator for a unit controls the addressing of time slots within a unit for the completion of a call between two terminal circuits.

3. A system as claimed in claim 2, in which each said unit includes a call processing controller and means for interfacing between a controller and the terminal circuits of its unit to forward supervisory control signals between the terminal circuits and the controller.

4. A system as claimed in claim 3, in which there is a system processor in communication with the controllers of each unit to control the interchange of supervisory information between unit controllers.

5. A system as claimed in claim 4, in which there is a plural bus network interfacing between the system processor and the unit controllers for the exchange of call control data and addresses over one or more of the busses of said bus network.

6. A telecommunications switching system using time division multiplex for controlling the interconnection between terminal circuits for respective calls from a calling terminal circuit to a called terminal circuit, the terminal circuits of said system being grouped into modules with each module including: a call control processor, means interfacing between a processor and its terminal circuits on a time division basis to exchange call control data, a time division concentrator for providing a time slot as a speech path for a call involving a terminal circuit of its module, said interfacing means also linking the module processor with the concentrator of that module to provide timing and terminal circuit address data to said concentrator over a bus separate from said speech path, and in which said interfacing means operates to scan the condition of the terminal circuits and includes a memory for storing an indication of said condition.

7. A switching system as claimed in claim 6, in which said interfacing means includes a last look memory for determining changes in terminal circuit condition for transmission of an indication of any condition change to the processor.

8. A switching system as claimed in claim 7, in which there is a system processor in communication with each of said module processors over a plural bus network for the control of calls between terminal circuits of different modules.

9. A switching system as claimed in claim 8, in which the concentrators of the respective modules are in communication over a time division bus network separate from said processor plural bus network.

10. A telecommunications system including at least one module, said module terminating a plurality of terminal circuits, said module including a time division data highway for enabling digital communication between terminal circuits, a time slot interchanger serving a plurality of terminal circuits and interfacing between said circuits and said highway, means for scanning terminal circuits on a time division basis over a common path other than said data highway, and a processor for controlling the operation of said scanning means and said interchanger, said scanning means further including memory for the status of each of said terminal circuits, and said interchanger including data memory for data interchange over said highway and memory for control of time slots for the data interchange.

11. A telecommunications system as claimed in claim 10, in which there are a plurality of like modules, and a system processor for directing the operation of the respective module processors.

12. A system as claimed in claim 11, in which there is a rank of interchangers interposed between data highways of the respective modules for providing data communication between data highways.

* * * * *